US005351042A

United States Patent [19]

Aston

[11] Patent Number: 5,351,042

[45] Date of Patent: Sep. 27, 1994

[54] LOCK, KEY AND COMBINATION OF LOCK AND KEY

[75] Inventor: Walter J. Aston, Dudley, England

[73] Assignee: Yale Securtiy Products Limited, Willenhall, England

[21] Appl. No.: 851,565

[22] Filed: Mar. 16, 1992

[30] Foreign Application Priority Data

Mar. 19, 1991 [GB] United Kingdom .............. 9105835.4

[51] Int. Cl.5 ....................... H04Q 1/00; G06K 19/06; E05B 47/06

[52] U.S. Cl. ................................ 340/825.31; 70/278; 70/283; 361/172

[58] Field of Search ....................... 340/825.56, 825.31, 340/825.32; 361/172; 70/283, 327, 429, 282, 281, 280, 279, 278, 277

[56] References Cited

U.S. PATENT DOCUMENTS

| | | | |
|---|---|---|---|
| 3,846,679 | 11/1974 | Jost et al. | 361/165 |
| 3,872,415 | 3/1975 | Clarke | 337/140 |
| 3,953,769 | 4/1976 | Sopko | 361/172 |
| 3,979,647 | 9/1976 | Perron et al. | 361/172 |
| 4,031,434 | 6/1977 | Perron et al. | 361/172 |
| 4,379,966 | 4/1983 | Flies | 340/825.31 |
| 4,594,637 | 6/1986 | Falk | 361/172 |
| 4,638,882 | 1/1987 | Sato | 361/172 |
| 4,753,465 | 6/1988 | Dalby | 292/32 |
| 4,848,115 | 7/1989 | Clarkson et al. | 70/283 |
| 4,866,962 | 9/1989 | Aston et al. | 70/277 |
| 5,140,317 | 8/1992 | Hyatt, Jr. et al. | 340/825.31 |

FOREIGN PATENT DOCUMENTS

| | | |
|---|---|---|
| 0288791 | 2/1988 | European Pat. Off. . |
| 0401647 | 12/1990 | European Pat. Off. . |

*Primary Examiner*—Donald J. Yusko
*Assistant Examiner*—Mark H. Rinehart
*Attorney, Agent, or Firm*—Dvorak and Traub

[57] ABSTRACT

A battery-less electronic cylinder lock comprises an electromagnet or other electrical release mechanism controlled by an electronic circuit. A cooperating key comprises a battery and a code producing circuit. When the key is inserted in the lock, power for the lock is supplied from the battery to the electronic circuit and the electromagnet by means of a transformer coupling arrangement with a primary portion in the key and a secondary portion in the lock. Alternatively, power may be supplied via electrical contacts on the key and on the lock.

10 Claims, 4 Drawing Sheets

LOCK, KEY AND COMBINATION OF LOCK AND KEY

BACKGROUND OF THE INVENTION

This invention relates to locks, for instance of the type known as cylinder locks, that is, locks which comprise a generally cylindrical body for attaching to a door or to a latch mechanism mounted on a door, the body containing a rotatable barrel which can be turned by means of an appropriate key inserted into a key slot in the barrel. The invention further relates to keys and to combinations of locks and keys.

Locks of this type are in very widespread use and in recent years there have been many attempts to replace locks of this type with electrically actuable locking means instead of the usual mechanically actuable locking mechanism which normally locks the barrel in position when the appropriate key is not in position in the key slot. The change to an electrically actuable locking means is intended to enable a very high level of security to be obtained by virtue of the very large number of key combinations which can be achieved utilising an electronic form of coding of the key.

Considerable effort has been expended on designing systems for reading various forms of code written on keys, often with a view to ensuring that keys which are used in the electrically actuable locks are also usable with other locks of the same basic type which are mechanically actuable.

One of the problems which arises, however, is the provision of a suitable source of operating power for the lock and electronic cylinder type locks currently in use require a battery to be installed to act as such power source. The result of this is that installation of an electronic cylinder type lock is made very complicated and it is certainly not possible to substitute an electronic cylinder lock for a conventional mechanical one without either cutting an enlarged rebate in the door to house the batteries or adding a special-purpose battery holder/bezel to the lock.

Preferred embodiments of the invention are defined in the other appended claims.

It is thus possible to provide an electronic cylinder-type lock which can be used as a direct replacement for a conventional mechanical cylinder-type lock.

To this end there may be provided a battery-less electronic cylinder-type lock in which means is provided for acquiring electrical power for the circuits contained in the lock from a battery contained in a coacting key.

Power transfer may be made by transformer coupling between a winding in the key and a winding in the lock, such coupling being established when the key is inserted into the key slot of the lock barrel. Circuits within the key apply alternating current to the winding in the key and the circuits in the lock include a rectifying circuit for rectifying alternating current induced in the winding in the lock. With such an arrangement the circuits in the key may be such as to modulate the alternating current signal applied to the key winding so as to transmit to the lock circuits signals representing a key code characteristic of the key.

Alternatively, power may be supplied to the lock circuits via a simple direct mechanical contact arrangement.

In either case, the circuits of the lock may be arranged (on receipt of an appropriate code from the key) to energise either a low energy electromagnet arrangement for unlocking the barrel, or a thermally operated actuator arrangement, such as a nickel-titanium wire actuator.

It is already known to transmit electrical power between a key and a lock and also to superimpose code signals to enable circuits in the lock to recognise a code characteristic of a key. However, with such arrangements, transfer of power is from a battery or other power source in the lock to circuits in the key to enable the key to transmit its coded signals.

The applicants have appreciated for the first time that the presence of a battery in an electronic lock is a severe disadvantage. As mentioned above, not only does the need for a lock battery confound or at least complicate installation of an electronic lock in place of a mechanical one, but failure of the battery will lead to very considerable problems. Access to the battery is usually only obtainable when the door controlled by the lock has been opened and it is therefore necessary for a battery-operated lock to have some means for actuating the lock in such an emergency situation. This will inevitably lead to considerable inconvenience for the user unless the emergency procedure is one which will very seriously compromise the security of the lock.

When the lock is battery-less, on the other hand, the failure of the battery in a key is not a serious matter and the door can still be opened by other keys. Battery replacement can be very simply carried out without comprising system security at all.

Electronically actuable locks are usually used only in situations where there are a several keys in regular use and whilst each lock may be operated with considerable frequency the frequency of use of each key will be comparatively low. It is therefore possible to attain an acceptably long battery life from a relatively small battery as compared with the type of battery needed for installation in the lock.

DETAILED DESCRIPTION OF THE INVENTION

Figure 1:
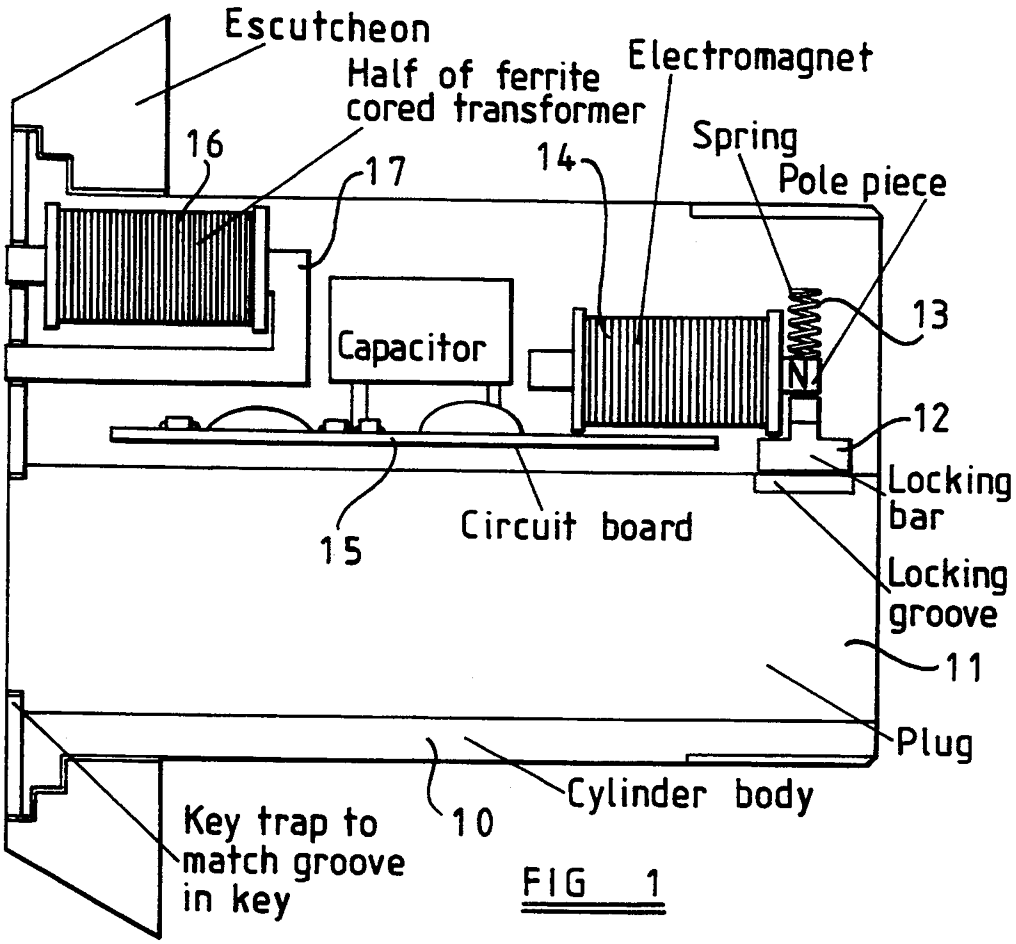
FIG. 1 is a longitudinal section through one example of an electronic cylinder-type lock in accordance with the invention.
Figure 2:
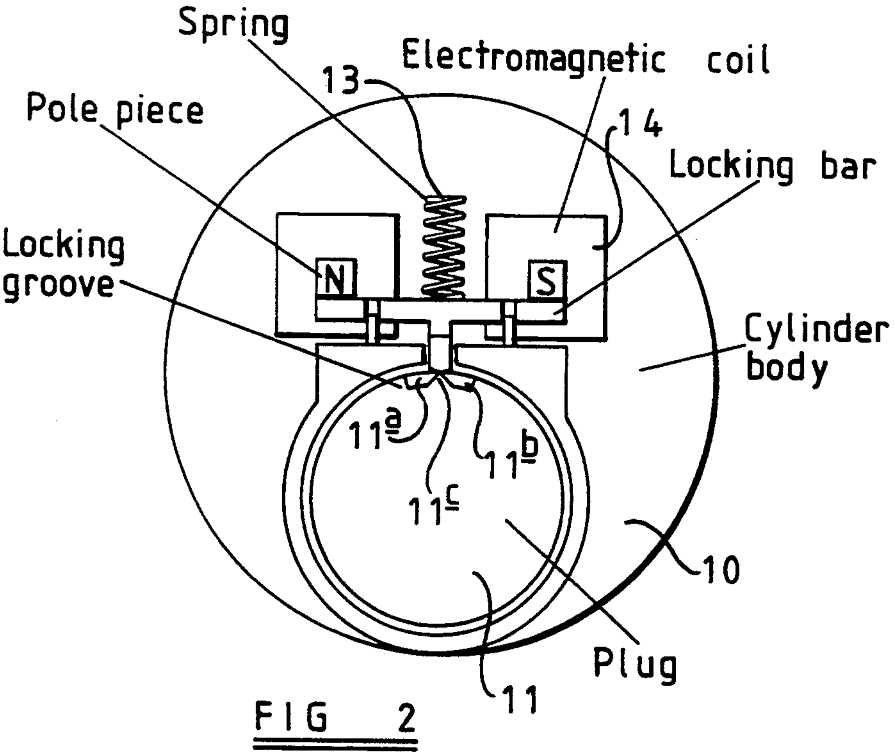
FIG. 2 is an end-wise sectional view of the lock shown in FIG. 1 viewed from the locking bar end.
Figure 3:
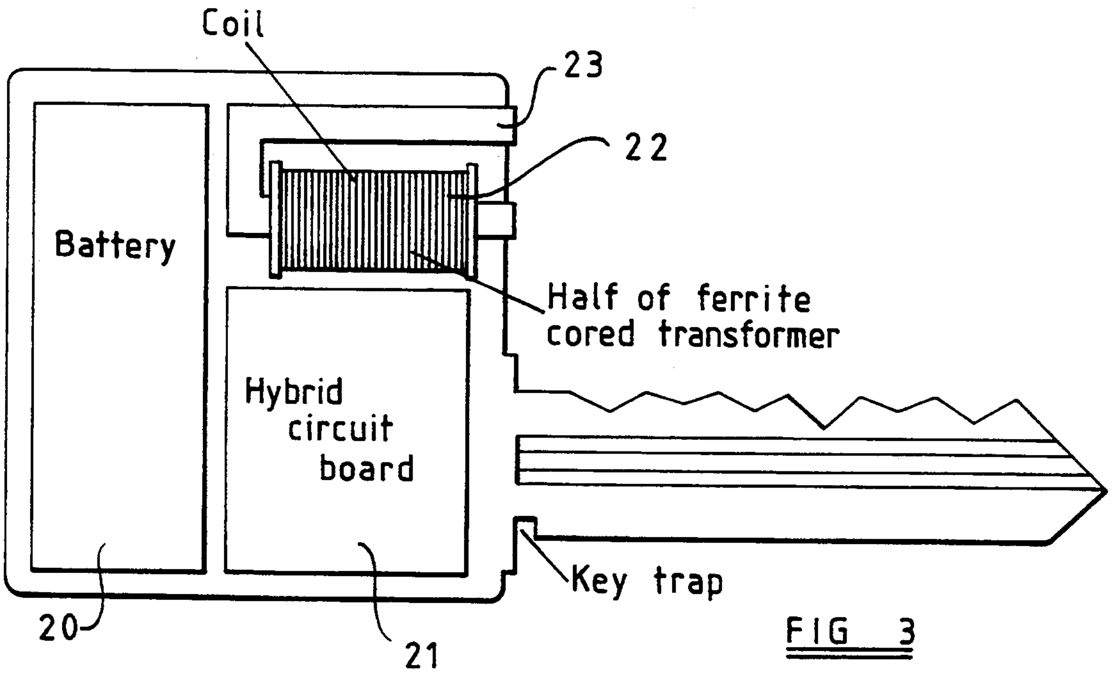
FIG. 3 is a part sectional elevation of a key intended to be used with the lock of FIGS. 1 and 2.

Referring firstly to FIGS. 1 and 2, the lock shown comprises a cylinder body 10 and a barrel 11 rotatably mounted in a passageway in the body. The barrel is formed with a key slot (not shown) to receive the end of a key as shown in FIG. 3.

Instead of the usual pin/tumbler arrangement conventionally used in cylinder-type locks, a single locking bar 12 is used to prevent rotation of the barrel relative to the body, except when an appropriate key is present in the key slot. As can be seen in FIG. 2, the barrel 11 is formed with a pair of side-by-side recesses **11*a*, 11*b* which are separated by a land 11*c*. In the locked position of the barrel, this land confronts the end of the locking bar 12, but if the barrel is turned slightly out of this position in either direction, the locking bar 12 is urged by a spring 13 into one recess or other, to prevent further turning of the barrel. The land 11*c* is shaped to act as a cam to lift the locking bar 12** against its spring loading.

An electromagnet 14 is provided for preventing the locking bar 12 dropping into the recesses when the barrel is turned with the electromagnet energised. The arrangement of the electromagnet is such that the air gap between its pole pieces and the locking bar 12 is minimal when the locking bar is in its lifted position. Since the locking bar is always in this position when the electromagnet 14 is energised, the current required to hold the locking bar in position will be very small (as compared with that which would be required to pull it in from a "dropped" position). No actual work has to be done in moving the locking bar against its spring loading so that the amount of electrical energy consumed is very small.

The body also contains a circuit board 15 which carries the control circuits for determining whether or not current should be supplied to the electromagnet. A winding 16 on a C-shaped core 17 is also mounted in the body with the ends of the limbs of the C flush with the end face of the cylinder body.

The key which is shown in FIG. 3 has a grip or bow portion which contains a battery 20, a circuit 21, and a winding 22 on a c-shaped core 23 matching the core 17. When the key is fully inserted into the key slot of the barrel, the two c-shaped cores are aligned to form a continuous ring, which couples the windings 16, 22 together to form a transformer. The circuit 21 is arranged to apply alternating current to the winding 22, at a frequency which may typically be up to 100 KHz, so that current is induced in the winding 17 which the circuit on the circuit board 15 in the cylinder rectifies to provide dc for operation of the cylinder circuitry. The circuit 21 also modulates the frequency of the alternating current supplied to the winding 22, so that a code embedded in the circuit 21 is transmitted via the transformer coupling to the cylinder circuits, where it is decoded and tested to ascertain whether the key is one which should be allowed to release the lock.

Figure 4:
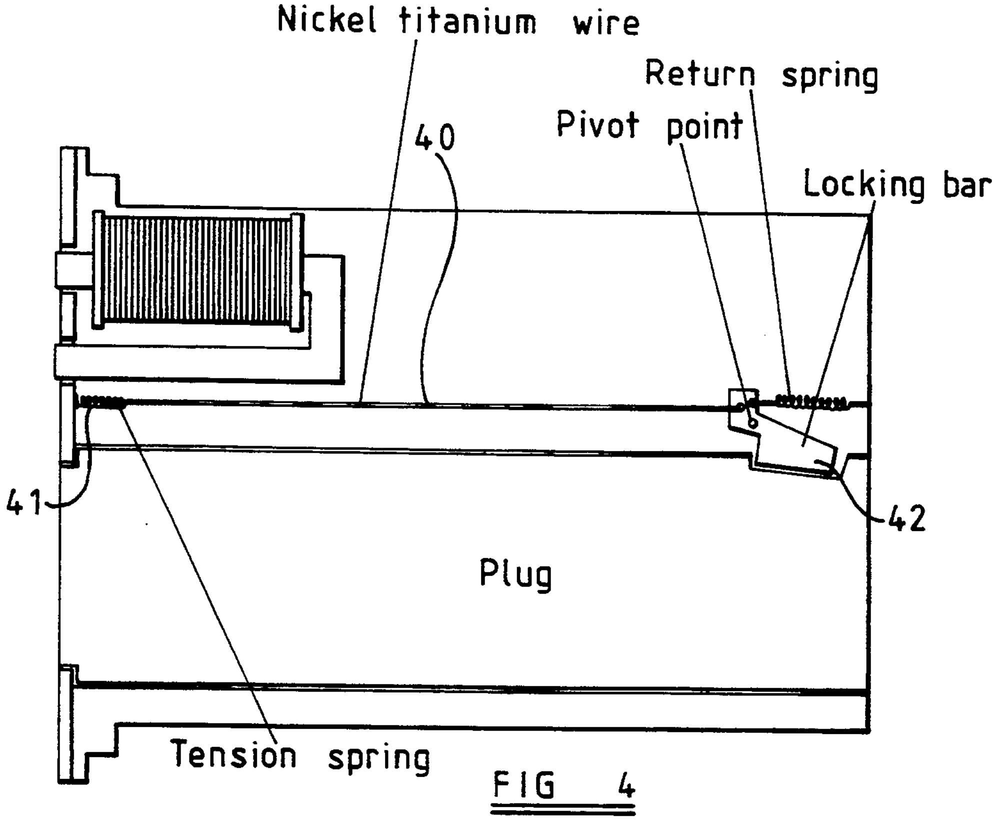
FIG. 4 is a section like FIG. 1 but showing a second example of the invention.

The example shown in FIG. 4 makes use of a length of nickel-titanium wire 40 instead of the electromagnet arrangement of FIGS. 1 and 2. This wire, which is available, for example, from Dynalloy Inc under the trade mark FLEXINOL TM, has the property that heating it whilst it is under tension causes it to shrink. Heating can be obtained by simply passing electrical current through the wire. In the arrangement shown in FIG. 4, the wire 40 is stretched between a spring 41 at the face of the cylinder body and a spring-loaded lever 42 at the opposite end. Shrinking of the wire when current passes through it causes the lever to be turned and thereby disengaged from a recess in the barrel.

Figure 5:
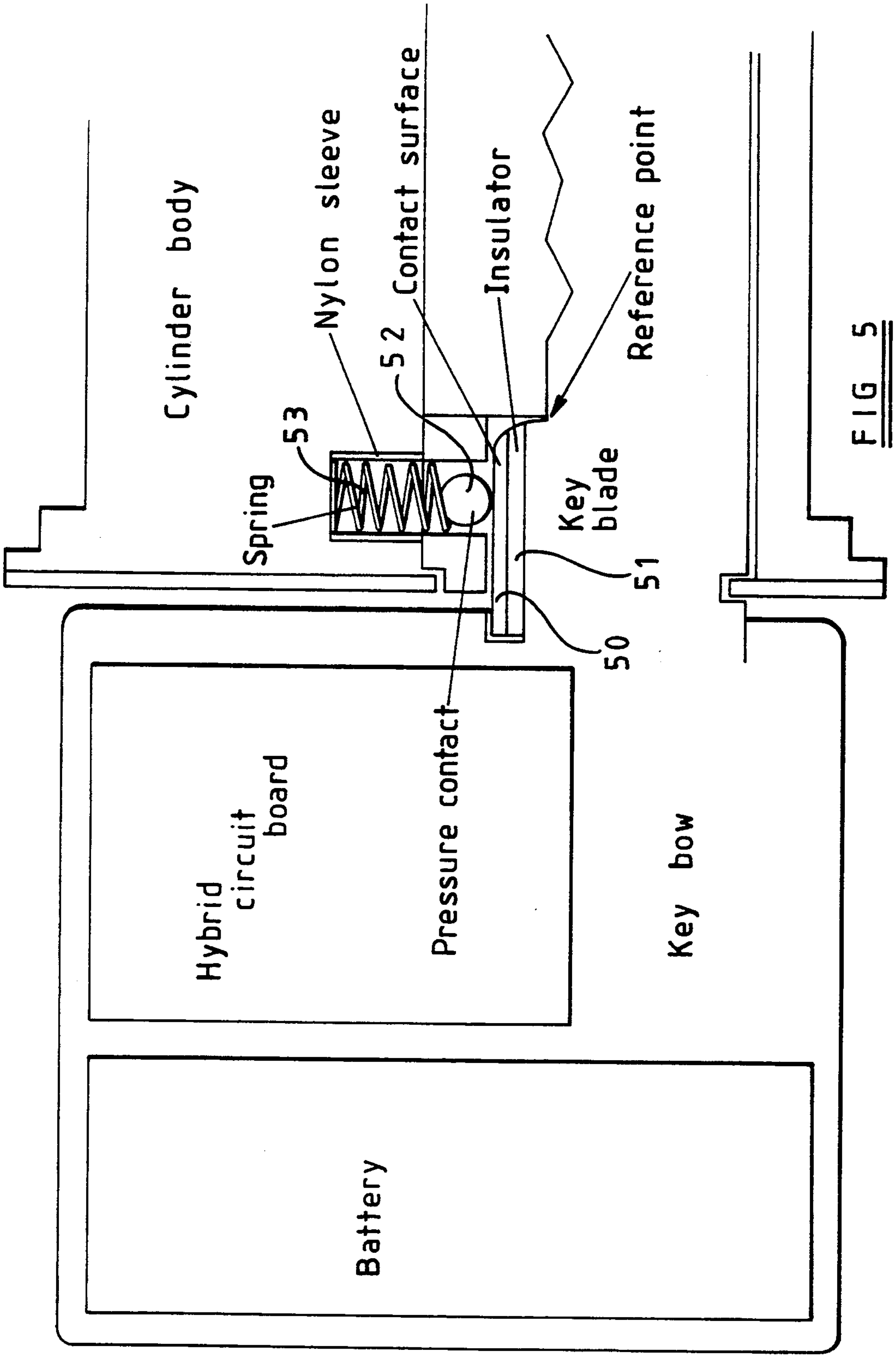
FIG. 5 is a part sectional view of an alternative electrical power transfer arrangement which could be used in either of the above-mentioned examples of the invention.

In a modification (not shown) of the arrangement shown in FIG. 4, a second wire, parallel to the wire 40 connects the spring 41 to the lever 42 and this second wire is arranged so as on shrinking to tend to turn the lever 42 in the opposite direction. Only the wire 40 has current applied to it when it is required to release the lock. The purpose of the second wire is to prevent the lock being opened by applying heat to the whole lock, for example by means of a gas burner. Turning finally to FIG. 5, the modification shown therein makes use of a mechanical contact arrangement for supplying current to the cylinder circuits from the key battery instead of the transformer coupling arrangement of FIGS. 1 to 3. To this end, a contact 50 carried by an insulating member 51 on the blade of the key is provided and this is arranged to make contact with a spring-loaded contact 52 mounted in an insulating carrier 53 in the cylinder. In this arrangement, the alternating current with the superimposed code signals is supplied to the lock via the electrical connection. Alternatively, direct current may be supplied to the lock circuits, together with superimposed code signals which are decoded in the lock electronic circuits to identify the key.

It will be noted that in both of the electrical energy transfer arrangements described above, energy is transferred only when the barrel is in its locking position and arrangements are therefore made to ensure that the key can only be inserted and withdrawn when the barrel is in this one position. Additionally, energy storage components, such as capacitors may be required in the lock electronic circuits to ensure continuing supply of energy thereto after the barrel has started turning out of its locking position.

Figure 6:
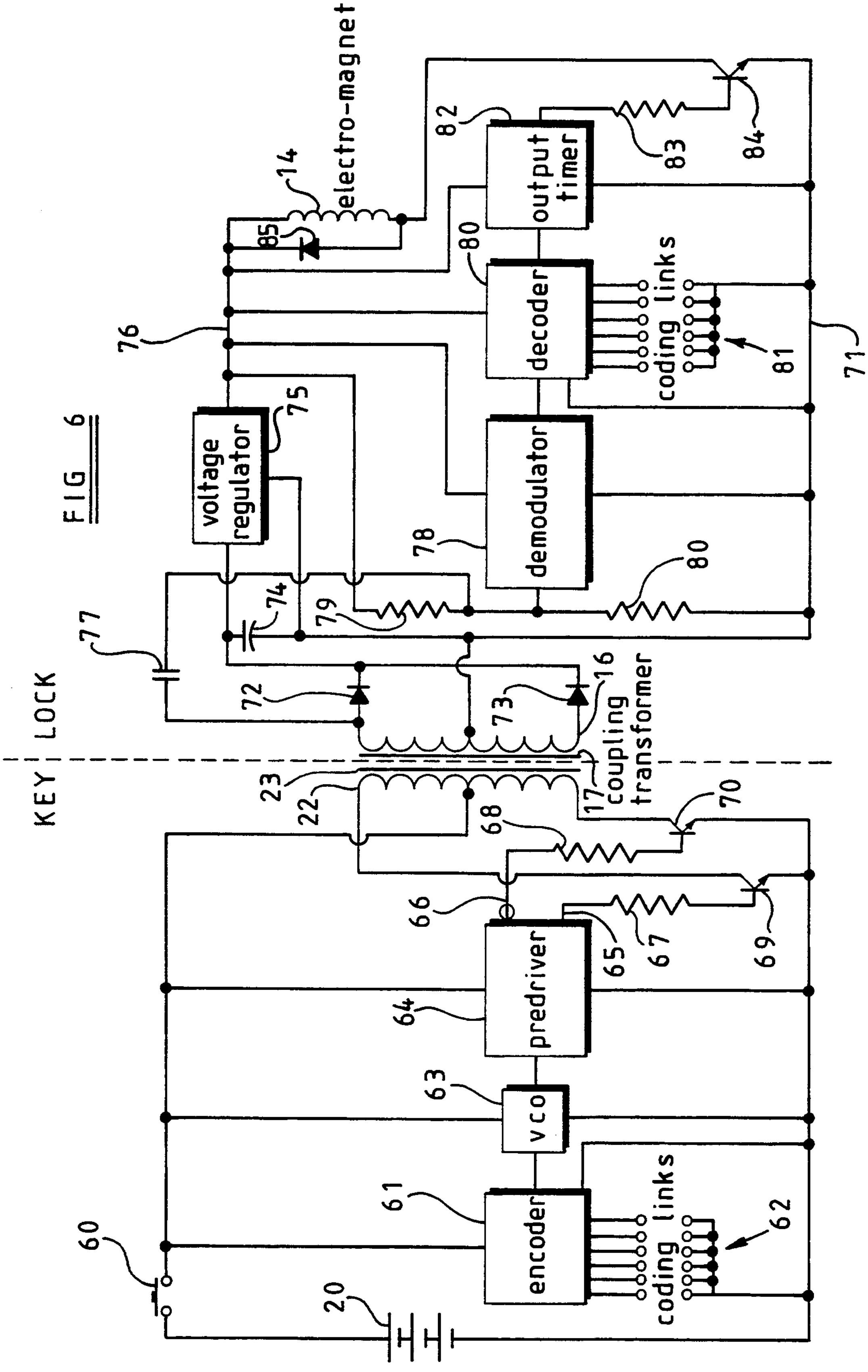
FIG. 6 is a circuit diagram of the lock of FIG. 1 and the key of FIG. 3.

FIG. 6 is a circuit diagram showing the circuit carried by the circuit board 15 in the lock and the circuit 21 in the key. The battery 20 is connected via a switch 60, which is operated manually when the key is inserted in the lock, to a positive supply line. The negative terminal of the battery 20 is connected directly to a negative supply line. An encoder 61 of standard type is connected to the supply lines and to a plurality of coding links 62 which are used to select the code of the key. In particular, shorting links are applied selectively to the coding links so as to define a binary number, which is supplied serially to the output of the encoder 61 when the switch 60 is closed.

The output of the encoder 61 is connected to a voltage controlled oscillator 63 which is arranged to perform frequency shift keying in response to the binary signals supplied by the encoder 61. The basic frequency of the oscillator 63 is chosen to be the optimum frequency for the coupling transformer arrangement between the key and the lock so as to maximise the transfer of power. The frequency shift or difference between the output of the oscillator 63 for a binary 1 or binary zero signal is approximately 5% of the basic frequency of the oscillator 63.

The output of the oscillator 63 is connected to the input of a predriver 64, which comprises a buffer amplifier and phase splitter. Thus, the predriver 64 supplies direct and inverted output signals to its outputs 65 and 66, respectively. The outputs 65 and 66 are connected via current-limiting resistors 67 and 68 to the bases of transistors 69 and 70, respectively, whose emitters are connected to the negative supply line and whose collectors are connected to opposite ends of the winding 22. The winding 22 has a centre tap connected to the positive supply line.

The winding 16 of the lock has a centre tap connected to a lock negative supply line 71. The ends of the windings 16 are connected to the anodes of diodes 72 and 73, whose cathodes are connected to one plate of a reservoir capacitor 74 and to the input of a voltage regulator 75. The other plate of the capacitor 74 and the common terminal of the regulator 75 are connected to the negative supply line 71. The output of the voltage regulator 75 is connected to a lock positive supply line 76.

One end of the winding 16 is connected via a capacitor 77 to the input of a demodulator 78, which input is biased by a potential divider comprising resistors 79 and 80 connected in series between the supply lines 71 and 76.

The output of the demodulator 78 is connected to the input of a decoder 80 which is provided with coding links 81 similar to those of the key. The demodulator 78 converts the frequency shift keyed signal to a binary digital signal and supplies the binary code received by the lock to the decoder 80. Shorting links are placed across selected ones of the coding links 81 so as to define the code to which the lock will respond. The decoder 80 compares the received code with this stored code and produces an output signal upon detecting coincidence between the codes.

The output of the decoder 80 is connected to the input of an output timer 82 which is arranged to provide an output signal of predetermined duration in response to detection of coincidence by the decoder 80. The output of the timer 82 is connected via a current limiting resistor 83 to the base of a transistor 84, whose emitter is connected to the negative supply line 71 and whose collector is connected to the electromagnet 14 and the anode of a diode 85 whose cathode is connected to the positive supply line 76 and to the other terminal of the electromagnet 14.

In use, the key is inserted into the lock and the switch 60 is actuated. The decoder 61 supplies the code defined by the shorted coding links 62 to the voltage control oscillator 63, which produces a frequency shift keyed output signal. This is supplied in antiphase by the predriver 64 to the transistors 69 and 70, which alternately conduct so as to form a push-pull circuit with the centre tapped winding 22.

The transformer action between the windings 22 and 16 and the cores 23 and 17 induces a corresponding frequency shift keyed oscillating signal in the winding 17. This is full-waved rectified by the diodes 72 and 73 and the resulting direct current is smoothed by the reservoir capacitor 74 and regulated by the voltage regulator 75 so as to supply power to the electronic circuits of the lock.

The frequency shift keyed signal is also coupled via the capacitor 77 to the demodulator 78 where it is converted into the corresponding digital binary code. This is compared with the code preset by the shorted coding links 81 in the decoder. In the absence of coincidence between the received and preset code, the electromagnet 14 remains de-energised and the lock remains locked. However, if the correct code has been supplied, coincidence is detected by the decoder 80 and the electromagnet 14 is actuated via the timer 82 and the transistor 84. The lock is thus unlocked to permit the cylinder to be rotated. Once the cylinder has begun to be rotated, the switch 60 may be released so as to preserve the life of the battery 20.

The locks described above, being battery-less, will have a very long service life.

I claim:

1. A batteryless electronic lock comprising:

a cylindrical body having a bore disposed therein;

a barrel rotatably disposed in the bore of the cylindrical body, the barrel having a recess with a central cam portion disposed therein;

a key slot disposed in the barrel, the key slot usable for receiving a blade of a coacting key;

a locking element disposed in the cylindrical body wherein the locking element may enter the recess and limit rotation of the barrel relative to the cylindrical body;

electromagnetic release means for controlling the locking element in response to an identification signal, the identification signal provided by the coacting key when the blade of the coacting key is disposed in the key slot wherein the central cam portion retains the locking element in a rest position in which an air gap between the locking element and the electromagnetic release means is minimized and wherein rotation of the barrel in either direction when the electromagnetic release means is not energized will cause the locking element to enter the recess and prevent further rotation of the barrel relative to the cylindrical body;

means for acquiring electrical power for the electromagnetic release means from the coacting key.

2. The lock as claimed in claim 1, wherein the means for acquiring electrical power comprises a secondary portion of a transformer.

3. The lock as claimed in claim 1, wherein the means for acquiring electrical power comprises an electrical contact for receiving current from a corresponding electrical contact of the coacting key.

4. The lock as claimed in claim 2, further comprising rectifying means connected between the means for acquiring electrical power and the electromagnetic release means.

5. The lock as claimed in claim 1, further comprising a frequency shift keying demodulator connected to the means for acquiring electrical power wherein the frequency shift keying demodulator receives frequency shift keyed signals from the coacting key.

6. The lock as claimed in claim 5, further comprising a decoder connected to the frequency shift keying demodulator.

7. The lock as claimed in claim 6, further comprising timing means for actuating the electromagnetic release means for a predetermined time in response to the decoder.

8. A combination of a battery-less lock and a coacting key, the combination comprising:

a cylindrical body having a bore disposed therein;

a barrel rotatably disposed in the bore of the cylindrical body, the barrel having a recess with a central cam portion disposed therein;

a key slot disposed in the barrel, the key slot usable for receiving a blade of the coacting key;

a locking element disposed in the cylindrical body, wherein the locking element may enter the recess and limit rotation of the barrel relative to the cylindrical body;

electromagnetic release means for controlling the locking element in response to an identification signal, the identification signal provided by the coacting key when the blade of the coacting key is disposed in the key slot, wherein the central cam portion retains the locking element in a rest position in which an air gap between the locking element and the electromagnetic release means is minimized and wherein rotation of the barrel in either direction when the electromagnetic release means is not energized will cause the locking element to enter the recess and prevent further rotation of the barrel relative to the cylindrical body;

means for acquiring electrical power for the electromagnetic release means from the coacting key, wherein the means for acquiring electrical power is disposed on the cylindrical body; and a circuit for producing an encoded signal for unlocking the locking element, a battery, and supplying means for supplying electrical power from said battery to said acquiring means, wherein the coacting key comprises the circuit, the battery, and the supplying means.

9. A batteryless electronic lock comprising:

a cylindrical body having a bore disposed therein;

a barrel rotatably disposed in the bore of the cylindrical body, the barrel having a recess with a central cam portion disposed therein;

a key slot disposed in the barrel, the key slot usable for receiving a blade of a coacting key;

a locking element disposed in the cylindrical body wherein the locking element may enter the recess and limit rotation of the barrel relative to the cylindrical body;

electromagnetic release means for controlling the locking element in response to an identification signal, the identification signal provided by the coacting key when the blade of the coacting key is disposed in the key slot wherein the central cam portion retains the locking element in a rest position in which an air gap between the locking element and the electromagnetic release means is minimized and wherein rotation of the barrel in either direction when the electromagnetic release means is not energized will cause the locking element to enter the recess and prevent further rotation of the barrel relative to the cylindrical body;

means for acquiring electrical power for the electromagnetic release means from the coacting key wherein the means for acquiring electrical power is disposed in the cylindrical body off an axis of the barrel.

10. The lock as claimed in claim 9, further comprising interlock means for allowing the coacting key to be removed from the key slot only when the barrel is in its locking position.

* * * * *